(12) United States Patent
Finkbeiner et al.

(10) Patent No.: US 7,973,435 B2
(45) Date of Patent: Jul. 5, 2011

(54) ELECTRICAL LINEAR DRIVE

(75) Inventors: Matthias Finkbeiner, Motzingen (DE); Jurgen Guckel, Filderstadt (DE)

(73) Assignee: Festo AG & Co. KG, Esslingen (DE)

( * ) Notice: Subject to any disclaimer, the term of this patent is extended or adjusted under 35 U.S.C. 154(b) by 283 days.

(21) Appl. No.: 12/194,228

(22) Filed: Aug. 19, 2008

(65) Prior Publication Data

US 2009/0058198 A1 Mar. 5, 2009

(30) Foreign Application Priority Data

Aug. 29, 2007 (EP) .................................... 07016879

(51) Int. Cl.
*H02K 41/02* (2006.01)
*H02K 33/00* (2006.01)
*H01R 12/00* (2006.01)

(52) U.S. Cl. ............... 310/12.01; 310/12.14; 310/12.19; 310/12.22; 310/12.31; 310/12.33; 310/20; 439/70

(58) Field of Classification Search .................... 310/12, 310/12.14, 12.19, 12.22, 12.31, 12.33, 20, 310/12.01; 439/70
See application file for complete search history.

(56) References Cited

U.S. PATENT DOCUMENTS

| 4,819,439 A * | 4/1989 | Higham .............................. 62/6 |
| 6,427,576 B1 * | 8/2002 | Bock et al. ....................... 92/5 R |
| 6,969,284 B2 * | 11/2005 | Singer et al. .................. 439/701 |
| 2006/0113847 A1 * | 6/2006 | Randall et al. .................. 310/12 |
| 2007/0296281 A1 * | 12/2007 | Choi ............................... 310/12 |

FOREIGN PATENT DOCUMENTS

| DE | 10244261 A1 | 4/2004 |
| DE | 10306461 A1 | 9/2004 |
| EP | 0985831 A2 | 3/2000 |
| EP | 1273807 A2 | 1/2003 |
| WO | WO9114871 A1 | 10/1991 |
| WO | WO9301646 A1 | 1/1993 |
| WO | WO0031421 A1 | 6/2000 |
| WO | WO2004075382 A2 | 9/2004 |

* cited by examiner

*Primary Examiner* — Quyen Leung
*Assistant Examiner* — Jose A Gonzalez Quinones
(74) *Attorney, Agent, or Firm* — Hoffmann & Baron, LLP

(57) ABSTRACT

An electrical linear drive device comprises an outer housing consisting of a housing tube and two housing covers disposed at the ends thereof The outer housing defines in the interior thereof a receiving space, into which the drive part of a drive unit in the form of an electrodynamic linear direct drive like a cartridge is placed, and an output drive rod extends outward through the front housing cover. From a drive coil arrangement of the drive unit an electrical operation cable extends to an central electrical interface means. The electrical interface means is disposed laterally on the housing tube and the operation cable and the signal cable extend in a cable channel formed in the wall of the housing tube.

23 Claims, 6 Drawing Sheets

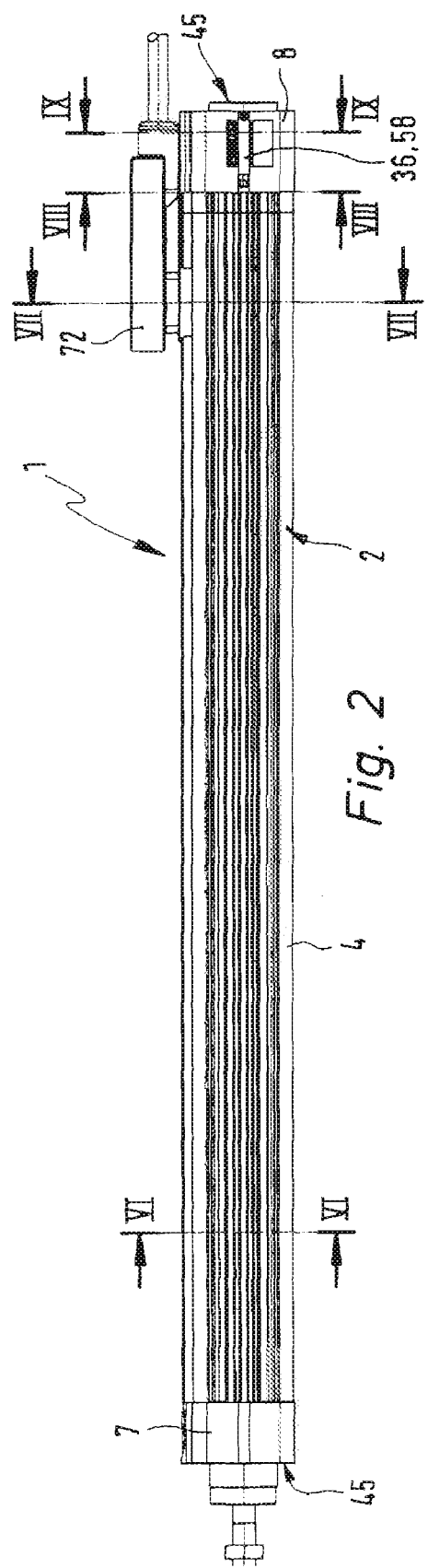
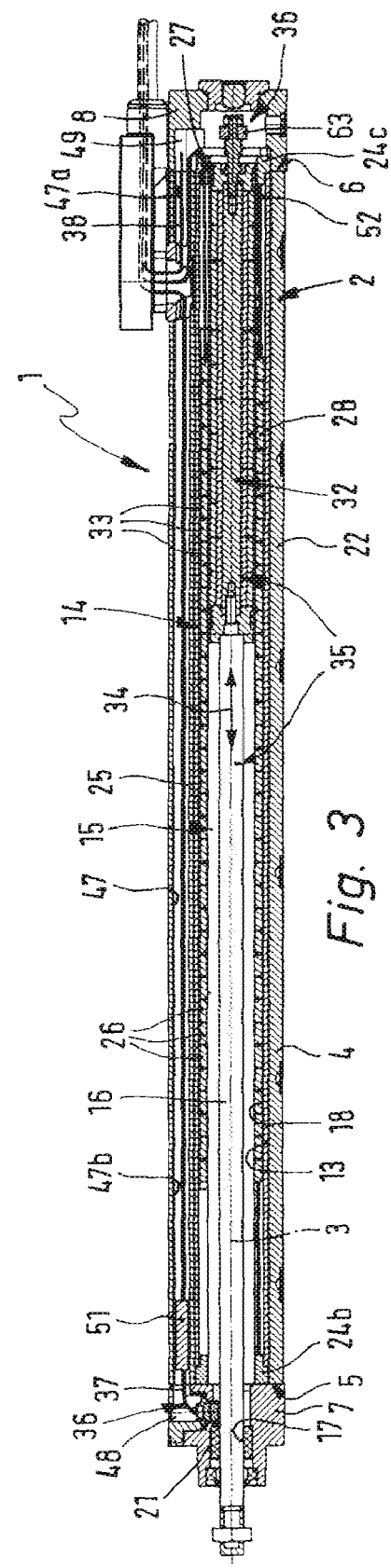

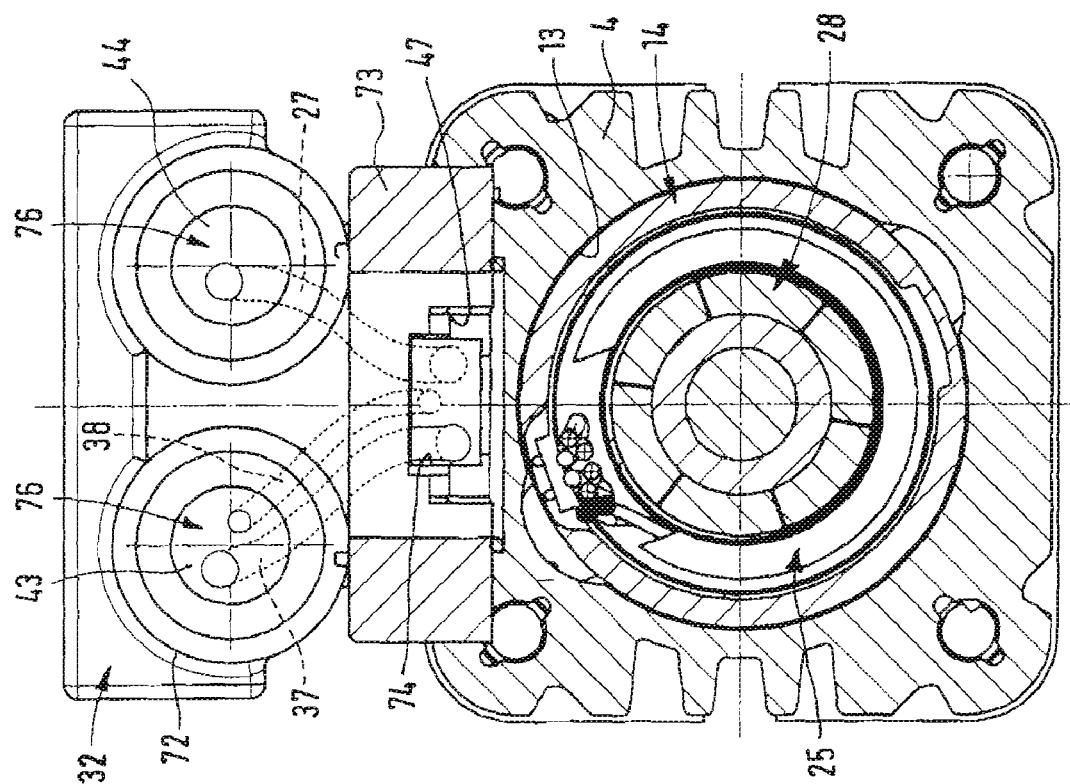
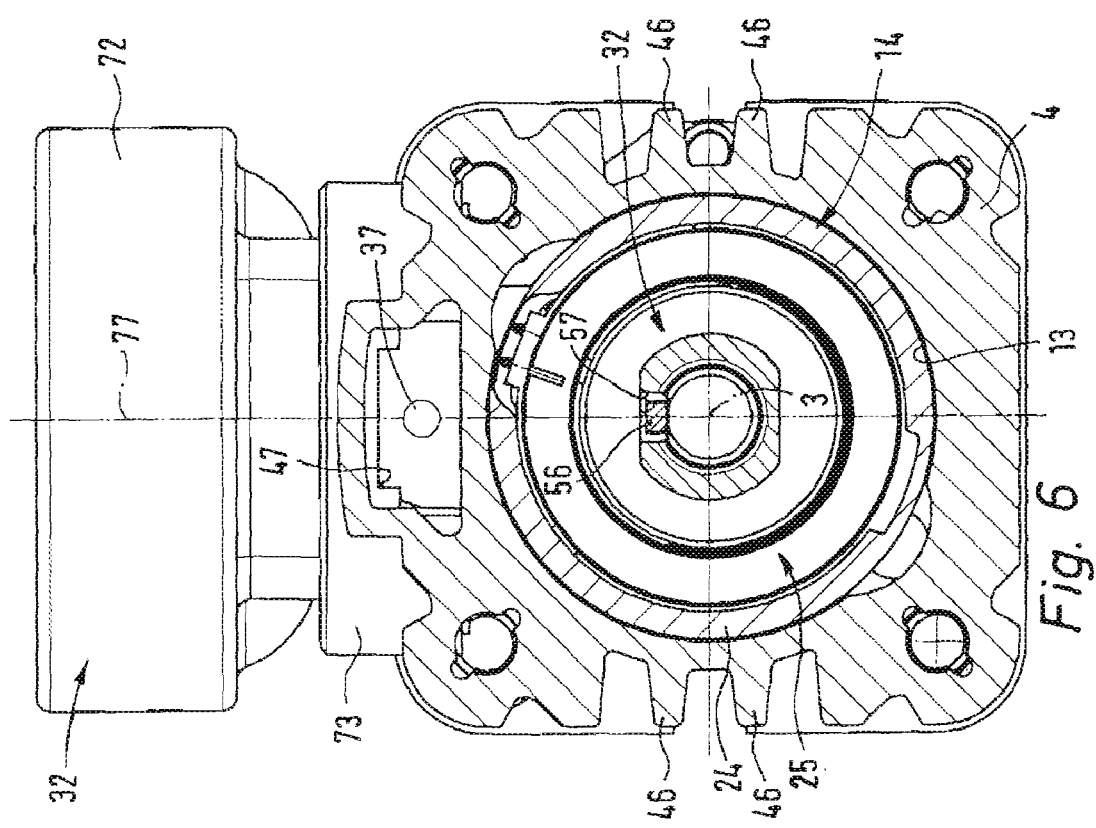

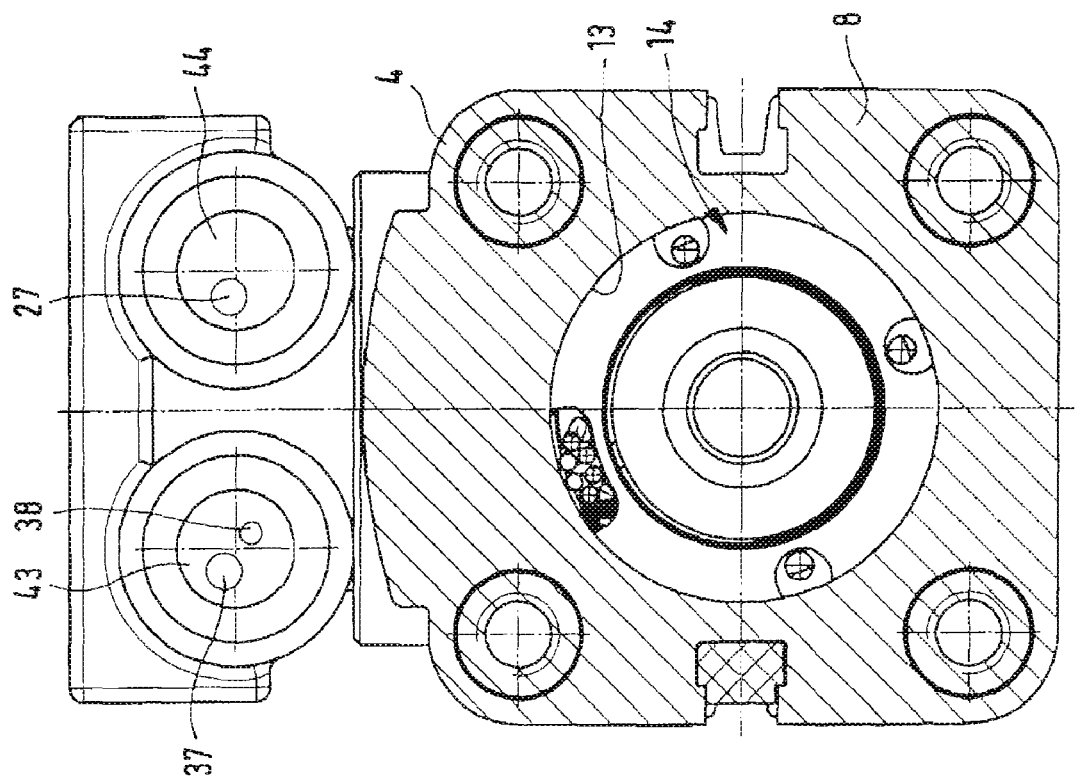
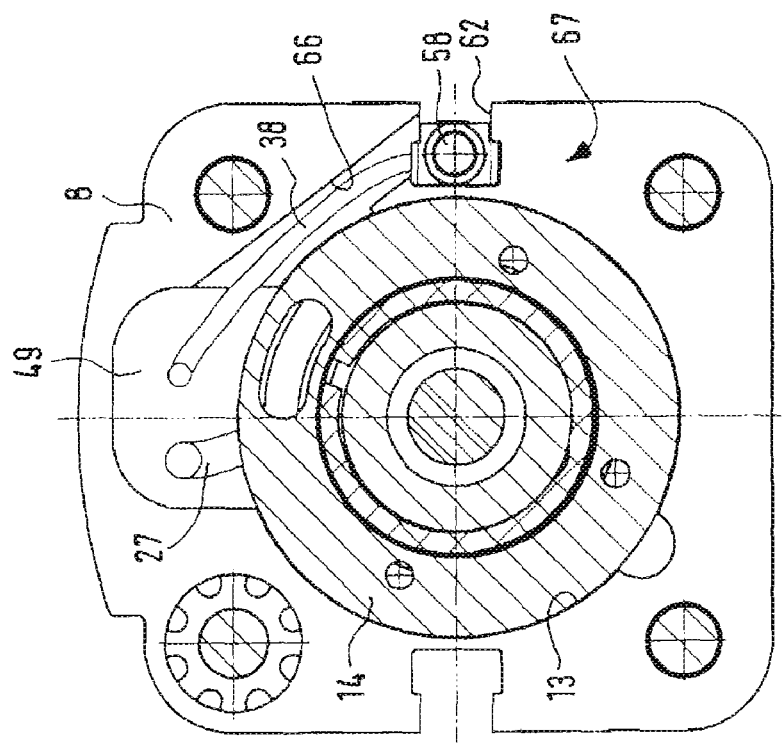

ELECTRICAL LINEAR DRIVE

CROSS-REFERENCE TO RELATED APPLICATION

This application claims priority based on European Application No. 07 016 879.4, filed on Aug. 29, 2007, which is incorporated herein by reference.

BACKGROUND OF THE INVENTION

1. Field of the Invention

The invention relates to an electrical linear drive device comprising an outer housing, in which the drive part of a drive unit designed in the form of an electrodynamic linear direct drive is inserted axially like a cartridge so that an output drive rod of the drive unit protrudes from the front side of the outer housing, and the drive part has an external drive housing that accommodates a stationary drive coil arrangement and an axially movable armature, which is connected with the output drive rod and has a drive magnet arrangement, a position detecting means for the detection of at least one axial position of the movable unit comprising the armature and the output drive rod, and a central electrical interface means, connected both with the drive coil arrangement and also with the position detecting means, for external electrical communication.

2. Brief Description of the Related Art

An electrical linear drive device disclosed in the European patent publication EP 1047881, of this type includes an outer housing into which the drive part of a drive unit in the form of an electrodynamic linear direct drive is inserted from the rear side. The drive unit as such is capable of functioning, the outer housing providing inter alia the mechanical interfaces for external attachment. In the interior of the housing termed the drive housing of the linear direct drive there is a drive coil arrangement able to be supplied with an excitation voltage in a clocked manner and furthermore a permanent magnet drive arrangement able to be linearly shifted in relation to it and arranged on an armature, away from which a drive rod extends, which renders possible output of the kinetic energy to the outside. For detection of at least one axial position of the moving unit and comprising the armature and the drive rod the linear direct drive is provided with a position detecting means. A central electrical interface means, arranged on the rear of the drive housing, renders possible the supply of the actuating energy necessary to produce the linear movement and the output of the detection signals generated by the position detecting means. This rear arrangement of the central electrical interface means often interferes with the installation of the linear drive device at the site of installation. Furthermore the drive part at the end is more or less exposed in the output housing and may readily attract dirt or be subject to other kinds of mechanical disorders.

The German patent publication DE 10244261, B4, describes an electrodynamic linear direct drive, which is suitable for use in principle with the above mentioned linear drive device. Accommodation in an additional output housing is however not explicitly provided.

The European patent publication EP 0985831, A2, describes in conjunction with a fluid power linear drive the accommodation of an electrical interface means, serving for the output of detection signals on a side wall of the housing tube. In the interior of the wall of the housing tube of the linear drive a tube channel in which a printed circuit board is placed, which is on the one hand connected with the electrical interface means and on the other hand with is accommodated in the same tube channel. The fluid power linear drive is in this case like the linear direct drive of the said German patent publication DE 10244261, B4, a self-contained drive, which is not in addition placed in an additional output housing.

SUMMARY OF THE INVENTION

One object of the present invention is to provide measures for an electrical linear drive device of the type initially mentioned, which are conducive to installation at the place of use while providing satisfactory protection against mechanical damage and optimized electrical communication features.

In order to perform this task the outer housing of the linear drive device possesses a housing tube, and arranged at the end thereof, a front housing cover through which the output drive rod extends, and furthermore a rear housing cover, which together delimit an accommodation space completely containing the drive part, and the central electrical interface means is arranged laterally on the housing tube axially between the two housing covers, and it is connected by way of at least one electrical operation cable with the drive coil arrangement and by way of at least one signal cable, separate from such operation cable, with the position detecting means, and these electrical cables extend outward, shut off from the outside, in at least one cable channel formed in the wall of the housing tube extending in the longitudinal direction of the housing tubes, said cable channel being peripherally closed.

The accommodation in a fashion screened off from the outside of the drive part in the accommodation space of the outer housing serves to provide for reliable protection against mechanical damage. In the same manner the electrical cables are safeguarded, which extend in at least one cable channel in the wall of the housing tube toward the central electrical interface means. Since the same is arranged laterally on the housing tube, the end sides of the outer housing are free for assembly operations, being more particularly the possibility of so placing the electrical interface means so that it does not protrude past either of the two end sides of the outer housing. Even during the manufacture of the housing tube it is possible to customize things so that the position of assembly for the installation of the central electrical interface means are prepared, more especially in the form of a through hole extending through the housing wall to the at least one cable channel. Starting at the central electrical interface means separate electrical cables lead to the drive coil arrangement and to the position detecting means, something which allows such laying thereof that the interfering fields of the quite substantial high coil currents do not impair the sensor signals. Accordingly, even without any complex screening measures for the electrical cables it is possible to achieve a reliable manner of operation with a high degree of precision. Finally owing to the outer housing made up of the housing tube and the two housing covers there is a possibility to having mechanical attachment interfaces, which correspond to those in the case of fluid operated linear drives. More particularly, it is possible to realize standard interfaces present in the case of fluid power linear drives. This generally opens up the possibility of installing the electrical linear drive device instead of fluid operated linear drives without rearrangement of adjacent equipment. A system of a machine may consequently be refitted quite simply for electrical drive technology.

Advantageous developments of the invention are defined in the dependent claims.

If the output drive rod in the front housing cover is guided for linear sliding movement while simultaneously being supported in the transverse direction, the length portion protruding from the outer housing may withstand substantial transverse forces without the components of the drive part being mechanically overloaded.

The linear drive device may be particularly simply assembled, if the housing cover inserted into the housing tube is held in an axially immovable fashion by the two housing covers secured at the two ends. It is then unnecessary to provide additional attachment means. Nevertheless, a radial gripping means for the drive part at the outer periphery is possible. The drive part may in either case may be inserted as part of a simple linear plugging operation into the housing tube.

It is an advantage if the electrical cables are inserted into the outer housing through one or both housing covers. Accordingly corresponding transverse channels in the wall of the housing tube are unnecessary. It is possible to trim the housing tube to any required length for customization, without ever involving further later trimming for internally arranged channels.

Preferably the cable channel opens at one end side of the housing tube at least and thence runs into a recess in the adjoining housing cover so that the associated electrical cable may extend out of the cable channel into the adjoining recess.

An arrangement is more especially advantageous in which the at least one operation cable and the at least one signal cable extend from opposite end sides of the housing tube to the central electrical interface means. This avoids an axial overlap of such cables and prevents in a particularly effective fashion any mutual impairment owing to resulting electrical interference.

In this respect at least one cable channel may be present, which extends right the way through the housing tube for its entire length and opens at both end sides, and the at least one operation cable extends in one channel portion and the at least one signal cable extends in the other of the two channel portions which, at the near and far side, adjoin the assembly position of the central electrical interface means.

The drive part is preferably so designed that its operation cable extends from the rear side and through the neighboring rear housing cover enters the cable channel of the housing tube leading to the central electrical interface. Simultaneously at least one signal cable connected with the position detecting means may extend from the front housing cover starting at the housing cover in the neighboring cable channel to the central electrical interface means. This signal cable is more especially connected with a displacement measurement system of the signal cable, which is located in the interior of the linear drive device. A sensor part of the displacement measurement system cooperating with the output drive rod without making contact is preferably arranged in the front housing cover and is connected by way of at least one signal cable with the central electrical interface means. More particularly it is a question of an incremental displacement measurement system.

In conjunction with an incremental displacement measurement system it is an advantage for the position detecting means for finding the zero point to have a reference sensor. This reference sensor is preferably seated on the rear housing cover and is activated by an actuating permanent magnet, which is arranged at the rear on the armature. During a linear movement of the armature the actuating magnet will accordingly shift through the drive coil arrangement coaxially surrounding the armature, it being surprisingly found that this does not involve any functional impairment.

The signal cable extending from the reference sensor extends in a protected fashion also in the interior of the outer housing to the central electrical interface means. In this respect it extends through the back housing cover and a cable channel formed in the wall of the housing tube, it being possible, because the reference sensor is only employed for zero point determination in the displacement measurement system, for it to extend a little farther alongside the at least one operation cable jointly with it in the one and the same cable channel of the housing tube.

The reference sensor is preferably fixed in an attachment groove in the outer periphery of the rear housing cover, its signal cable extending in a cable passage channel, opening into the attachment groove, in the rear housing cover.

In order to ensure that with the electrical connection with external means does not involve any mutual impairment owing to interfering fields, the central electrical interface means is preferably provided with two separate cable outlet means, from which separate connection cables or leads may extend of which the one is assigned to the at least one operation cable and the other is assigned to the at least one signal cable.

Since the electrodynamic linear direct drive is inclined to suffer from substantial overheating, it is an advantage if axially extending cooling ribs are provided on the outer periphery of the housing tube.

Finally it is advantageous if on at least one and preferably on both housing covers mechanical attachment interfaces are provided, which render possible an external attachment of the linear drive device and/or the mounting here of additional parts.

BRIEF DESCRIPTION OF THE DRAWINGS

In the following the invention will be explained with reference to the accompanying drawings.

FIG. 2 shows the linear drive device as in FIG. 1 in a lateral view.

FIG. 3 shows the linear drive device as in FIG. 1 in a longitudinal section taken on the line III-III.

FIG. 6 represents a cross section taken through the linear drive device on the line VI-VI in FIG. 2.

FIG. 7 is a cross section taken through the linear drive device taken on the section line VII-VII in FIG. 2, the central electrical interface means only being partially sectioned.

FIG. 8 represents a cross section taken through the linear drive device taken on the section line VIII-VIII in the joint part between the housing tube and the rear housing cover and without showing the central electrical interface means.

FIG. 9 shows a cross section taken through the linear drive on the line IX-IX in FIG. 2, the central electrical interface means not being sectioned.

DETAILED DESCRIPTION OF THE EMBODIMENTS

Figure 1:
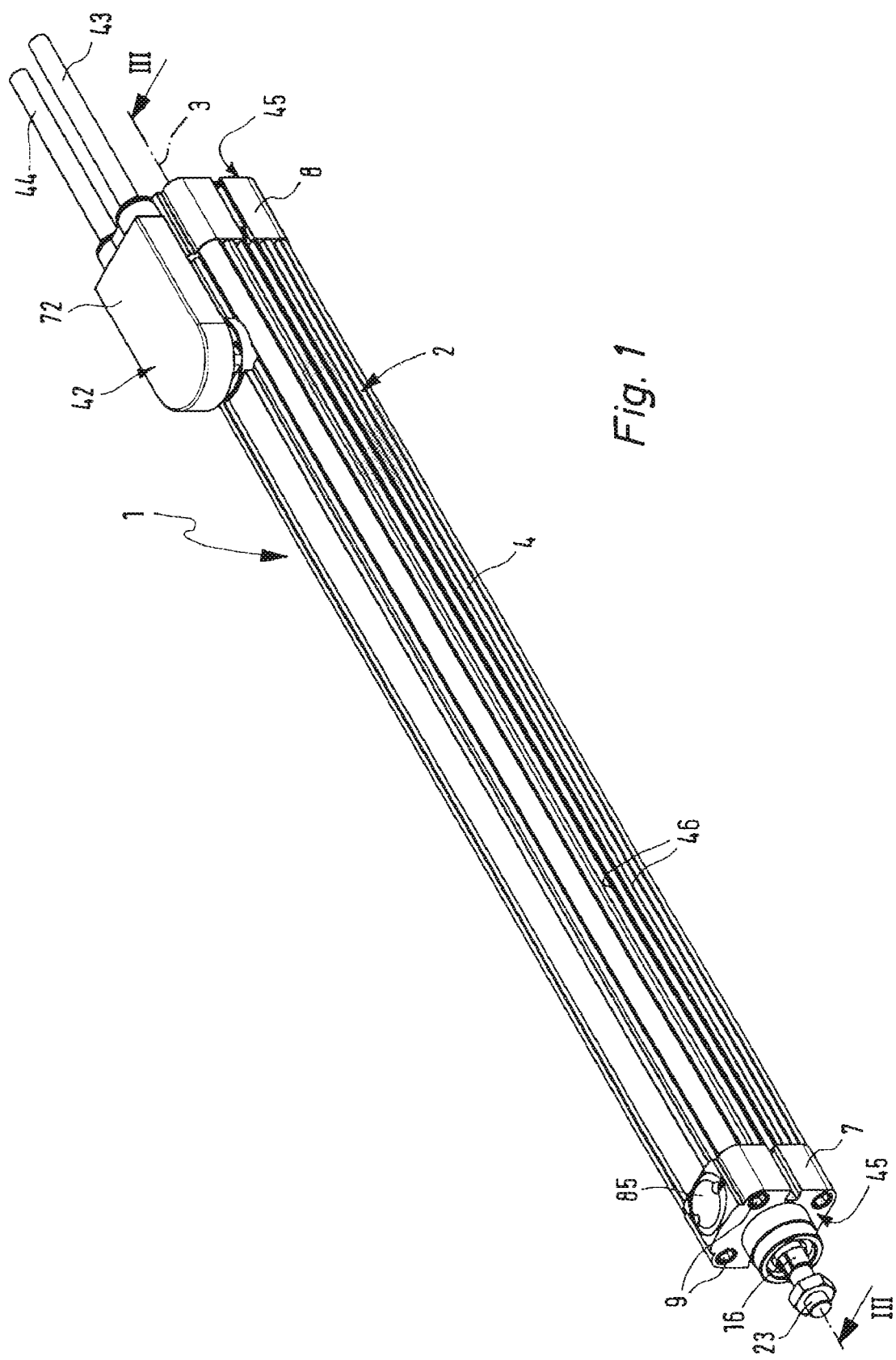
FIG. 1 is a perspective representation of a preferred working example of the electrical linear drive device.
Figure 4:
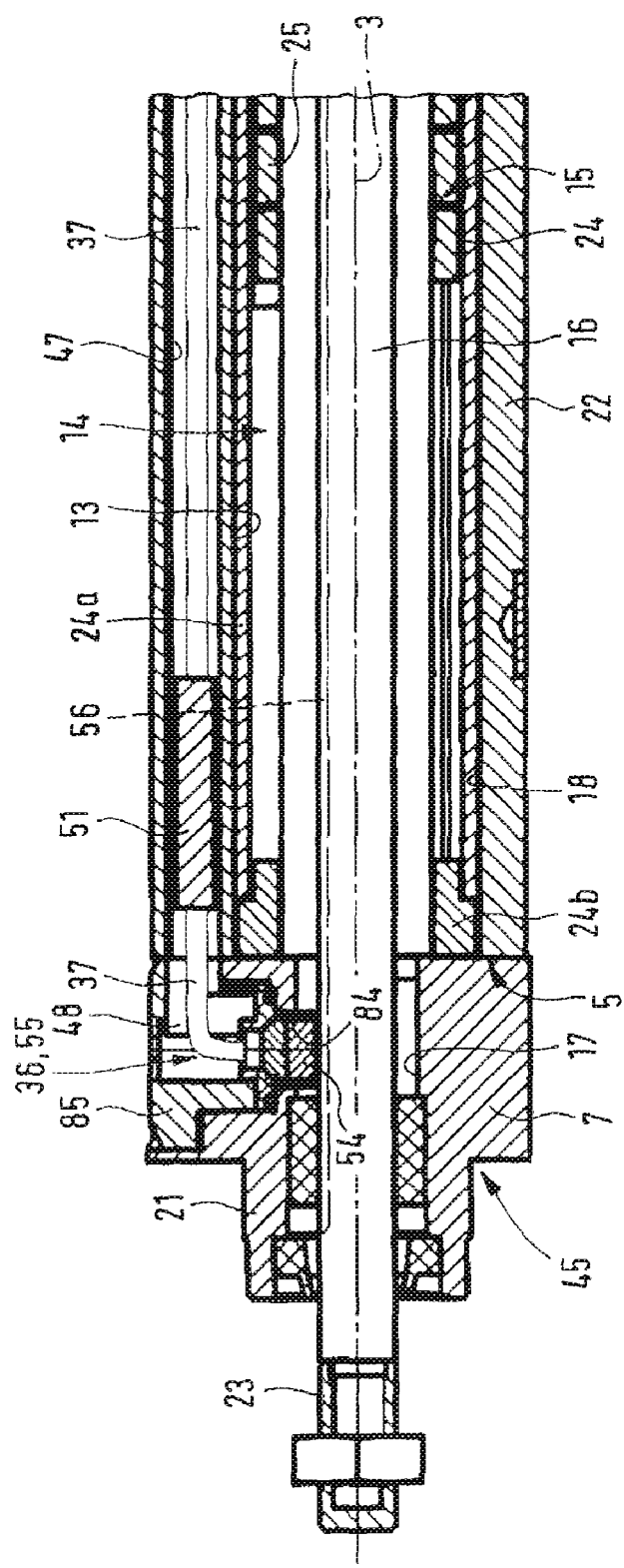
FIG. 4 shows the front end portion of the linear drive device in a longitudinal section.
Figure 5:
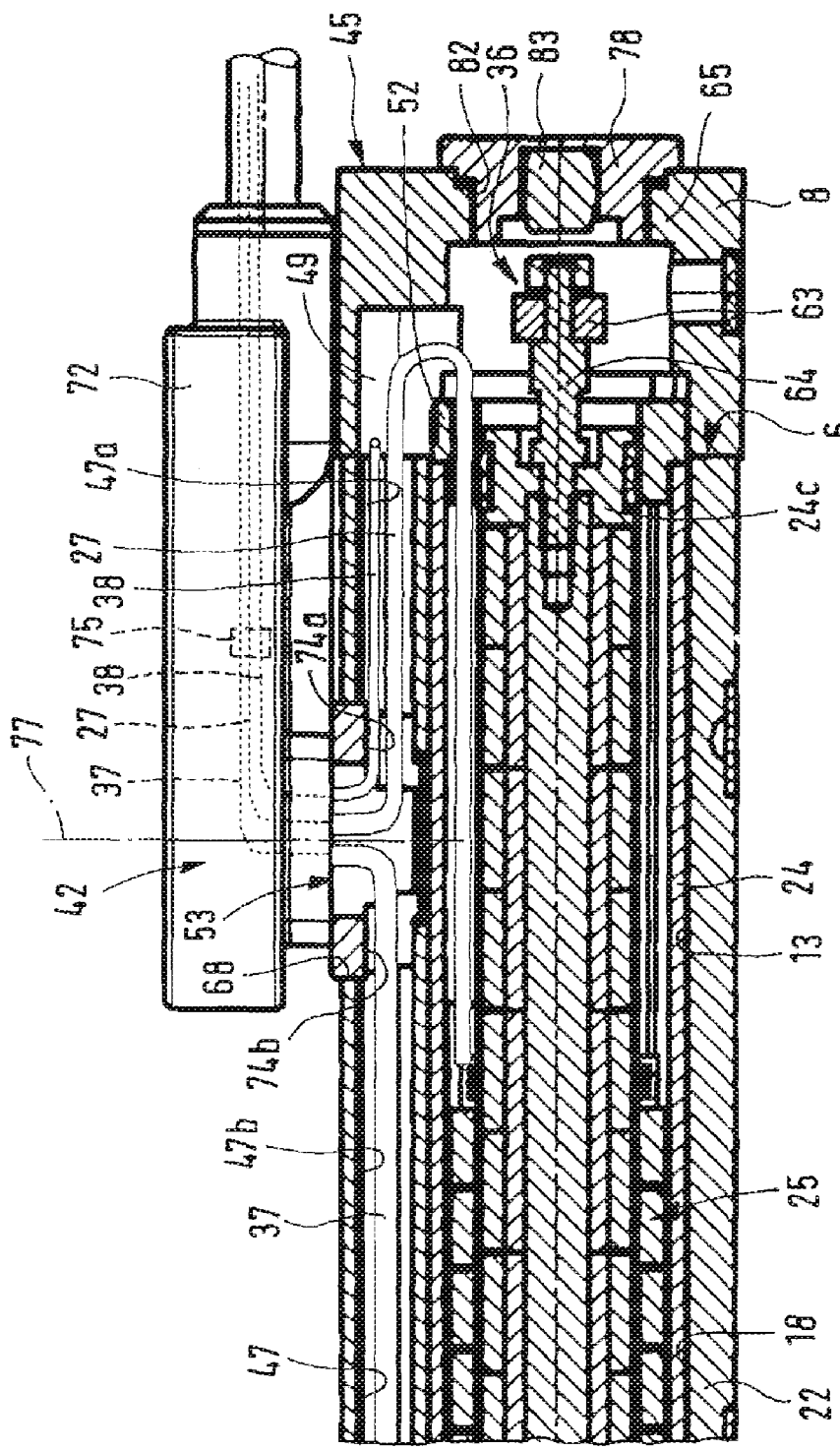
FIG. 5 is a longitudinal section through the rear end portion of the linear drive device.

The electrical linear drive device generally referenced 1 possesses an outer housing 2 with a longitudinal extent, whose longitudinal axis is referenced 3. The outer housing 2 is composed of an elongated housing tube 4, a front housing cover 7 mounted on the front end face 5 of the housing tube 4 and a rear housing cover 8 on the end face 6 of the housing tube 4. The housing covers 7 and 8 are braced axially by axial attachment screws 9 onto the housing tube 4 in a detachable manner.

The housing tube 4 and the two housing covers 7 and 8 jointly define a receiving space 13 with an essentially cylindrical outline. In this space there is a cartridge-like drive part 14 of a electrodynamic linear drive as a electrical drive unit 15. An output drive rod 16, protruding from the drive part 14 at the front end side, of the drive unit 15, extends through a coaxial opening 17 in the front housing cover.

During assembly of the linear drive device 1, prior to the attachment of the rear housing cover 8, the drive unit 15 may be plugged with the output drive rod to the fore from the rear end axially into the freely accessible interior space 18 in the housing tube 4. In the completely inserted state the drive part 14 is supported by the two housing covers 7 and 8 in the receiving space 13 so as to be axially immovable. Within the housing tube 4 the drive part 14 is radially supported and centered by the wall 22 surrounding the tube's inner space 18. The simplest way to effect this is to have a complementary configuration of the outer periphery of the drive part 14 and of the inner periphery of the receiving space 13. In any case such configurations will be so matched that the drive part 14 is radially fixed in place just by the insertion operation without further attachment means in the interior of the receiving space 13.

The drive part 14 is completely surrounded by the outer housing 2. Of the drive unit 15 only the output drive rod 16 extends from the outer housing 2, whose outer end portion is in the form of an attachment portion 23, on which a load to be shifted may be attached.

The drive part 14 has an outer drive housing 24 with a tubular wall portion 24a, which engages the bore face of the space 18. It constitutes a magnetic yoke for a drive coil arrangement 25 which is generally sleeve-like and is arranged in a stationary manner in the drive housing 24 and is composed of several axially succeeding separate coils 26. The drive coil arrangement 25 may extend along the full axial length or—as illustrated—merely along part of the length of the tube wall portion 24a.

An electrical cable, termed an operation cable 27, extends from the drive coil arrangement 25, and by way of such cable power in the form of a clocked exciting voltage may be supplied. Accordingly a traveling magnetic field is formed, which cooperates with a permanent magnetic drive arrangement 28, which is a component of an armature or runner 32 linearly moving within the drive housing 24 in the direction of the longitudinal axis 3. Preferably the drive magnet arrangement 28 comprises several coaxially adjoining individual annular magnets 33, which respectively are integral or are segmented. However other configurations are possible, for example a disk-like configuration. In the case of magnet rings an iron core is as a rule placed in the interior, whereas in the case of magnet disks an iron disk may be respectively placed between the neighboring magnet disks as a pole shoe. It is important that a radially extending magnetic field of maximum strength be formed, since only the radially extending field parts contribute to force production.

The above mentioned output drive rod 16 is attached to the armature 32 at its inner end portion so that together with same it constitutes a movable unit 35, which is able to be driven by the interaction by the drive coil arrangement 25 and the drive magnet arrangement 28 to perform a linear working movement 34, indicated by the double arrow, in the direction of the longitudinal axis 3.

Preferably the linear direct rod 16 is guided for sliding movement during its linear movement within the front housing cover 7 with a simultaneous transverse supporting action. This is in this case ensured by means of a guide bushing 21 inserted in the front housing cover 7 and surrounding the output drive rod 16. Accordingly transverse forces due to a load acting on the attachment portion 23 doe not affect the armature 32, something which reduces wear between the armature 32 and the stationary components of the drive part 14.

During the working movement 34 the armature 32 has its drive coil arrangement 25 always completely within the drive housing 24. To define the two end of stroke positions a front and a rear terminal element 24b, and 24c, may be arranged at the end sides on the tubular wall portion 24a. In the working embodiment the rear terminal element 24c, however has no stroke limiting function, as will be explained below.

A position detecting means generally referenced 36 of the linear drive device 1 renders possible the detection of at least one axial position of the movable unit 35 composed of the armature 32 and the output drive rod 16. The detection signals generated by the position detecting means 36 are transmitted by means of electrical cables as an output, there being in the present case a first electrical cable signal cable 37 and a second electrical signal cable 38.

The operating cable 27 and the two electrical signal cables 37 coming from the position detecting means 36 are independent, mutually separate electrical cables and extend independently of each other to a central electrical interface means 42 arranged externally on the outer housing 2. The term "central" employed in the present case means that here all electrical cables 27, 37 and 38 run together so that electrical connection cables 43 and 44 serving for the connection with external electrical peripheral devices can be connected in a locally limited portion of the linear drive device 1.

It is to be noted that the number of electrical cables running in the linear drive device 1 may be different to the number in the working example. Furthermore, single-core and multicore cables can be employed.

The central electrical interface means 42 is arranged laterally to the outside on the housing tube 4 axially between the two housing covers 7 and 8. Accordingly the axially outwardly aligned end faces of the two housing covers 7 and 8 may be used for attachment purposes and may be in the form of attachment interfaces 45, by using which the linear drive device 1 is able to be secured to a holding structure provided for this purpose. There is more especially the possibility of tailoring the outer configuration of the housing covers 7 and 8 to match the shape of fluid power linear drives, and in particular with the standard interfaces used therein so that the electrical linear drive device 1 may be installed instead of fluid driven linear drives without any problem.

It is also an advantage if the electrical interface means 42 is so arranged and so designed that it does not extend axially beyond the outer housing 2. This is a further factor in order not to impair the terminal attachment of the outer housing 2.

The wall 22 of the housing tube 4 has its outer face preferably provided with several cooling ribs 46 extending parallel to the longitudinal axis 3 and serving for improved transfer of heat to the surroundings. In the working embodiment illustrated they are arranged in pairs on mutually opposite outer faces of the housing tube 4, which preferably has a rectangular and more particularly a square outline. It is a question preferably of integral components of the preferably extruded housing tube 4.

The electrical cables 27, 37 and 38 extending from the drive coil arrangement 25 and from the position detecting means 36 extend in the interior of the outer housing 2 in a manner so that they are shut off from the outside, and extend along at least one cable channel 47 within the wall 22 of the housing tube 4. The signal cable 47 is peripherally complete and extends in parallelism to the longitudinal axis 3. In the case of extrusion of the housing tube 4 it may be directly formed integrally in position.

Accordingly it is possible to so lay the cables within the electrical linear drive device 1 that they are shut off from the surroundings and protected from damage as far as the central electrical interface means 42.

The working example has a cable channel 47 for all electrical cables 27, 37 and 38, such channel being more especially being the only one longitudinal channel used in the housing tube 4.

The cable channel 47 opens at the two end faces 5 and 5 to merge with a respective recess 48 and 49 of the neighboring housing cover 7 and 8.

The operation cable extends out of the rear end portion 52, facing the rear housing cover 8, of the drive part 14 and then runs through the recess 49 of the rear housing cover and enters the cable channel 47 at the rear end face 6. Thence it extends in the adjoining rear channel portion 47a, of the cable channel 47, viz. as far as the assembly position 53 of the housing tube 4 at which the electrical interface means 42 is mounted.

The first electrical signal cable 37 runs separately from the actuating cable 27 to the assembly position 53, viz. from the opposite axial side, i. e. starting at the front housing cover 7. Here it extends in the channel portion 47b, running between the assembly position 53 and the front end face 5 of the housing tube 4, of the cable channel 47.

The first electrical signal cable 37 extends from a sensor part 54 of the position detecting means 36, which is incorporated in the front housing cover 7. Following the sensor part 54 the first electrical signal cable 37 firstly runs through the recess 48 in the front housing cover 7 to then enter the front channel portion 47b. To the extent that the sensor technology employed requires it or makes its desirable, it is furthermore possible to have in addition electronic circuitry 51 on the first electrical signal cable 37, for example a printed circuit board having electrical circuitry. This may be accommodated in the front channel portion 47b.

While therefore the operation cable 27 starting at the central electrical interface means 42 extends to the rear housing cover 8, the first signal cable 37 runs in the opposite direction to the front housing cover 7 so that an overlapping cable arrangement is avoided. Accordingly electrical fields generated in the surroundings of the operation cable 27 are without any disadvantageous effect on the detection signals issued by way of the first electrical signal cable 37, viz. even when the electrical cables have no or only minor screening means as a protection against electromagnetic radiation.

The sensor part 54 is preferably a component of a displacement measurement system 55 of the position detecting means 30 using which the current axial position of the movable unit 35 can be found along its full stroke. In the working embodiment resort is had to an incremental displacement measurement system 55, in the case of which the output drive rod 16 is furnished with a longitudinally extending magnetic strip 56, which possesses several magnetized zones which are scanned by the sensor part 54 without making contact. Since this method is known as such a detailed description thereof is considered unnecessary. It is however to be noted that the magnetized strip 56 is preferably accommodated in a longitudinal groove 57 appearing in FIG. 6 in a capsule means. The displacement measurement system may be more particularly designed in accordance with the content of the European patent publication EP 0695879, B1.

The first electrical signal cable 37 therefore supplies detection signals of the displacement measurement system 55, it being a particular advantage owing to the continuous measurement that the operation cable 27 with the exclusion of the part with the electrical interface means 42 extends separately from the first electrical signal cable 37.

If the two electrical cables 27 and 37 were to extend starting at the housing cover to the electrical interface means 42, they would best be arranged in a separate cable channel 47 through the wall 22 with a sufficient transverse clearance to avoid interfering electromagnetic effects.

The position detecting means 36 comprises, more particularly when it is fitted with an incremental displacement measurement system 55, preferably in addition a position sensor 58 responsive to only an axial position of the movable unit 35. The latter functions as a reference sensor for setting the zero point of the incremental displacement measurement system 55. The second electrical signal cable 38 runs from this position sensor 58, and is also laid to extend to the electrical interface means 42.

The position sensor 58 is preferably arranged on the rear housing cover 8, it being secured in the working example in an attachment groove 62, which is located in the outer periphery of the rear housing cover 8, viz. in a portion, which overlaps the internal receiving space 13 axially.

For the activation of the position sensor 58 the armature 32 is provided at its rear side with an actuating magnet 63, which the armature 32 in its rear end of stroke position so lies radially within the position sensor 58 that it operates same without making contact. The position sensor 58 is in this case a magnetic field responsive sensor, as for example a Hall sensor or a so-called Reed switch.

In the course of the working movement 34 the actuating magnet 63 travels within the drive coil arrangement 25 coaxially surrounding the armature 32. As has been determined this then affects neither the actuation of the drive unit 15 nor the magnetization 63.

As has also been surprisingly found the magnetic field of the drive coil arrangement 25 does not affect the functionality of the magnetic strip 56, although same moves during the working movement 34 of the armature 32 in such magnetic field.

Preferably the actuating magnet 63 is arranged at a distance from the armature 32 on a support pin 64, which is arranged on the armature 32 and extends from its rear side coaxially.

When the movable unit 35 is in the rear end of stroke position, the armature 32 will halt at an axial distance from the axial terminal wall 65 of the rear housing cover 8. Its rear end portion is in this case located approximately in the transition zone between the housing tube 4 and the rear housing cover 8, the rear housing cover 8 being generally cup-like in form. The support pin 64 bearing the actuating magnet 63 then extends from the armature 32 into the end portion surrounded by the rear housing cover 8 of the receiving space 13.

In order to ensure that the second electrical signal cable 38 is also safeguarded against mechanical damage, it is laid in the interior of the outer housing 2 toward the electrical interface means 42. For this purpose in the rear housing cover 8 there is a cable receiving channel 66 formed between the attachment groove 62 and the recess 49. The second electrical signal cable 38 consequently runs from the position sensor 58 through the cable receiving channel 66 as far as the recess 49 and thence into the rear channel portion 47a, and thence to the electrical interface means 42.

The cable receiving channel 66 may be constituted by a groove, which is cut in the end face, facing the housing tube 4, of the rear housing cover 8 and is covered by the rear end face 6 of the housing tube 4.

The second electrical signal cable 38 admittedly extends within the rear cable portion 47a, a short distance alongside the actuating cable 27 and is therefore subjected to its electromagnetic fields. However this does not lead to a disadvantageous effect, since the detection signal of the position sensor 58 is only initially required as a reference signal for initializing the position detecting means 36.

Irrespectively of this it would be naturally possible to contrive the position detecting means 36 with one or more position sensors like the position sensor 58, with which one or more axial positions occurring during operation of the drive unit 35 may be detected. However it is preferably to design the position detecting means 36 in the form of a displacement measurement system.

The central electrical interface means 42 is mounted at the above mentioned assembly position 53 from the outside on the housing tube 4. At the the assembly position 53 the wall 22 of the housing tube 4 has an opening 68, through which the electrical cables 27, 37 and 38 extend from the cable channel 47 and enter a junction housing 72 of the electrical interface means 42. In the working the wall opening 68 serves also for mechanical attachment of the electrical interface means 42. In the working embodiment in this case a sleeve-like foot portion 73 of the interface means 42 fits into the wall opening 68 and is secured to the outer housing 2. The component, lying within the cable channel 47, of the foot portion 73 possesses diametrally disposed wall openings 74a, and 74b, through which the electrical cables 27, 37 and 38 may enter the cavity in the foot portion 73.

For sealing off the foot portion 73 and here more particularly to seal the two wall openings 68 off from the housing tube 4, for example using a composition such as an adhesive with a low viscosity, it is possible to obtain the desired level of electrical protection for the entire linear drive device. The cable outlets on the position detecting means 36 and the drive part 14 are in any case inherently safeguarded.

Starting at the interior of the foot portion 73 the electrical cables 27, 37 and 38 run into the interior of the junction housing 72, where they are connected to the statonary electrical contact means 75, with which the outwardly directed electrical connection cables 43 and 44 are electrically joined. Accordingly electrical communication with external devices is ensured, with which the electrical connection cables 43 and 44 are connected.

In the present working example the junction housing 72 and the foot portion 73 have an L-like configuration. The junction housing 72 therefore extends from the foot portion 73 radially, it lying in a plane parallel to the longitudinal axis 3 so that it assumes a position near the outer face of the housing tube 4.

Preferably the junction housing 72 is so secured to the foot portion 73 that it can be set in different angular position. Accordingly the orientation of the two preferably mutually parallel cable outlet means 76 may be varied, at which the electrical connection cables 43 and 44 leave, which are joined with the electrical contact means 75. The axis 77 of rotation, about which angular positioning takes place, extends radially to the longitudinal axis 3 and coincides with the longitudinal axis of the preferably sleeve-like foot portion 73.

For the junction housing 72 there are preferably at least four angular settings spaced by 90, degrees from each other.

This allows an alignment, in which the cable outlet means 76 extend either to the rear or to the front or toward one of the two sides.

The cable outlet means 76 are preferably designed like nipples and define inlet openings for the electrical connection cables 43 and 44. The latter preferably possess a cable sheath with an electromagnetic shield for the cable cores therein, which are or may be brazed or soldered to the electrical contact means 75 or are undetachably connected therewith.

The rear terminal element 24c, can be so designed that it does not perform any abutment function as regards the armature 32. This renders it possible to draw the entire movable unit 35 for servicing purposes backward out of the drive housing 24, the drive housing 24 together with the drive coil arrangement 25 secured in it being able to remain in position in the drive housing 24.

In order to pull out the movable unit 35 either the back housing cover 8 is temporarily unscrewed or a closure cover 78, let into, or mounted the rear terminal wall 65 of the rear housing cover 8, is removed in order to have access to an access opening 82 extending through the rear terminal wall 65, such opening allowing the passage of the movable unit 35.

If the rear terminal unit 24c, does not function as an abutment element, the rear housing cover 8 may assume this function. Thus in the working example the end of stroke travel position is defined by having the support pin 64 running up against a buffer element 83 arranged on the rear terminal wall 65 and preferably borne by the closure cover 78.

The design of the linear drive device 1 allows the production of a high level of protection, that is to say a high degree of protection against the entry of dirt and moisture. Furthermore the geometry of the device makes it easy to clean.

The receiving chamber 84 containing the sensor part 54 is also sealed off in the rear housing cover 7 by a closure cover 85 applied to the front housing cover 7 from the side. The closure cover 85 is attached so that it may be removed and the sensor part 54 may be readily replaced in case of a defect. The recess 48 in the front housing cover 7 may be at least partly formed in the closure cover 85.

If for the operation of the linear drive device 1 further electrical cables are required for further internal structures, they are preferably laid in a covered manner inside the outer housing 2. To the extent that a connection is necessary with the electrical interface means 42, then these further electrical cables will preferably run in the a cable channel in the wall 22 of the housing tube 4.

What is claimed is:

1. An electrical linear drive device comprising an outer housing, in which the drive part of a drive unit designed in the form of an electrodynamic linear direct drive is inserted axially like a cartridge so that an output drive rod of the drive unit protrudes from the front side of the outer housing, and the drive part has an external drive housing that accommodates a stationary drive coil arrangement and an axially movable armature, which is connected with the output drive rod and has a drive magnet arrangement, a position detecting means for the detection of at least one axial position of the movable unit comprising the armature and the output drive rod, and a central electrical interface means, connected both with the drive coil arrangement and also with the position detecting means, for external electrical communication, wherein the outer housing possesses a housing tube and, arranged at the ends thereof, a front housing cover and a rear housing cover, which altogether delimit a receiving space completely accommodating the drive part, the output drive rod extending through the front housing cover, and wherein the central electrical interface means is arranged laterally on the housing tube axially between the two housing covers and is connected by way of at least one electrical operation cable with the drive coil arrangement and by way of at least one electrical signal cable, separate from such operation cable, with the position detecting means, and all these electrical cables extend, concealed to the outside, in at least one peripherally closed cable channel formed in the wall of the housing tube and extending in the longitudinal direction of the housing tube, the external drive housing of the drive part comprising a tubular wall portion surrounding the drive coil arrangement while engaging an inner face of the housing tube of the outer housing, the tubular wall portion being a magnet yoke for the drive coil arrangement.

2. The linear drive device in accordance with claim 1, wherein the output drive rod is guided linearly in the front housing cover with a simultaneous transverse support action.

3. The linear drive device in accordance with claim 1, wherein the drive part is supported by the two housing covers in the receiving space in an axially immovable fashion.

4. The linear drive device in accordance with claim 1, wherein the drive part is radially supported and held within the housing tube by the wall thereof.

5. The linear drive device in accordance with claim 1, wherein the at least one operation cable and the at least one signal cable extend within the housing tube starting at the central electrical interface means without axial overlap in opposite directions.

6. The linear drive device in accordance with claim 1, wherein the electrical operation cable(s) and signal cable(s) on their way to the drive magnet arrangement and to the position detecting means subsequent the at least one cable channel are extending in at least one of the housing covers.

7. An electrical linear drive device comprising an outer housing, in which the drive part of a drive unit designed in the form of an electrodynamic linear direct drive is inserted axially like a cartridge so that an output drive rod of the drive unit protrudes from the front side of the outer housing, and the drive part has an external drive housing that accommodates a stationary drive coil arrangement and an axially movable armature, which is connected with the output drive rod and has a drive magnet arrangement, a position detecting means for the detection of at least one axial position of the movable unit comprising the armature and the output drive rod, and a central electrical interface means, connected both with the drive coil arrangement and also with the position detecting means, for external electrical communication, wherein the outer housing possesses a housing tube and, arranged at the ends thereof, a front housing cover and a rear housing cover, which altogether delimit a receiving space completely accommodating the drive part, the output drive rod extending through the front housing cover, and wherein the central electrical interface means is arranged laterally on the housing tube axially between the two housing covers and is connected by way of at least one electrical operation cable with the drive coil arrangement and by way of at least one electrical signal cable, separate from such operation cable, with the position detecting means, and all these electrical cables extend, concealed to the outside, in at least one peripherally closed cable channel formed in the wall of the housing tube and extending in the longitudinal direction of the housing tube, the electrical operation cable(s) and signal cable(s) on their way to the drive magnet arrangement and to the position detecting means subsequent the at least one cable channel extending in at least one of the housing covers, the at least one cable channel opening at least at one end side of the housing tube where it merges with a recess of the adjoining housing cover which serves for guiding the cable.

8. An electrical linear drive device comprising an outer housing, in which the drive part of a drive unit designed in the form of an electrodynamic linear direct drive is inserted axially like a cartridge so that an output drive rod of the drive unit protrudes from the front side of the outer housing, and the drive part has an external drive housing that accommodates a stationary drive coil arrangement and an axially movable armature, which is connected with the output drive rod and has a drive magnet arrangement, a position detecting means for the detection of at least one axial position of the movable unit comprising the armature and the output drive rod, and a central electrical interface means, connected both with the drive coil arrangement and also with the position detecting means, for external electrical communication, wherein the outer housing possesses a housing tube and, arranged at the ends thereof, a front housing cover and a rear housing cover, which altogether delimit a receiving space completely accommodating the drive part, the output drive rod extending through the front housing cover, and wherein the central electrical interface means is arranged laterally on the housing tube axially between the two housing covers and is connected by way of at least one electrical operation cable with the drive coil arrangement and by way of at least one electrical signal cable, separate from such operation cable, with the position detecting means, and all these electrical cables extend, concealed to the outside, in at least one peripherally closed cable channel formed in the wall of the housing tube and extending in the longitudinal direction of the housing tube, the at least one electrical operation cable connected with the drive coil arrangement and the at least one electrical signal cable connected with the position detecting means extending from opposite end sides of the housing tube in the at least one cable channel to the central electrical interface means.

9. The linear drive device in accordance with claim 8, wherein a cable channel is present extending through the housing tube for the entire length thereof, with which the central electrical interface means is joined at an assembly position of the housing tube spaced axially from the two housing covers, the operation cable extending in the channel portion leading from the assembly position to the one housing cover and the signal cable extending in the channel portion extending from the assembly position to the other housing cover, of the cable channel.

10. The linear drive device in accordance with claim 8, wherein at least one signal cable starting at the central electrical interface means extends to the front housing cover, whereas at least one operation cable starting at the central electrical interface means runs to the rear housing cover.

11. The linear drive device in accordance with claim 10, wherein the at least one signal cable running to the front housing cover leads to a displacement measurement system of the position detecting means.

12. An electrical linear drive device comprising an outer housing, in which the drive part of a drive unit designed in the form of an electrodynamic linear direct drive is inserted axially like a cartridge so that an output drive rod of the drive unit protrudes from the front side of the outer housing, and the drive part has an external drive housing that accommodates a stationary drive coil arrangement and an axially movable armature, which is connected with the output drive rod and has a drive magnet arrangement, a position detecting means for the detection of at least one axial position of the movable unit comprising the armature and the output drive rod, and a central electrical interface means, connected both with the drive coil arrangement and also with the position detecting means, for external electrical communication, wherein the outer housing possesses a housing tube and, arranged at the ends thereof, a front housing cover and a rear housing cover, which altogether delimit a receiving space completely accommodating the drive part, the output drive rod extending through the front housing cover, and wherein the central electrical interface means is arranged laterally on the housing tube axially between the two housing covers and is connected by way of at least one electrical operation cable with the drive coil arrangement and by way of at least one electrical signal cable, separate from such operation cable, with the position detecting means, and all these electrical cables extend, concealed to the outside, in at least one peripherally closed cable channel formed in the wall of the housing tube and extending in the longitudinal direction of the housing tube, the at least one operation cable starting at the rear end portion of the drive part and through the rear housing cover entering the at least one cable channel, leading to the central electrical interface means, of the housing tube.

13. An electrical linear drive device comprising an outer housing, in which the drive part of a drive unit designed in the form of an electrodynamic linear direct drive is inserted axially like a cartridge so that an output drive rod of the drive unit protrudes from the front side of the outer housing, and the drive part has an external drive housing that accommodates a stationary drive coil arrangement and an axially movable armature, which is connected with the output drive rod and has a drive magnet arrangement, a position detecting means for the detection of at least one axial position of the movable unit comprising the armature and the output drive rod, and a central electrical interface means, connected both with the drive coil arrangement and also with the position detecting means, for external electrical communication, wherein the outer housing possesses a housing tube and, arranged at the ends thereof, a front housing cover and a rear housing cover, which altogether delimit a receiving space completely accommodating the drive part, the output drive rod extending through the front housing cover, and wherein the central electrical interface means is arranged laterally on the housing tube axially between the two housing covers and is connected by way of at least one electrical operation cable with the drive coil arrangement and by way of at least one electrical signal cable, separate from such operation cable, with the position detecting means, and all these electrical cables extend, concealed to the outside, in at least one peripherally closed cable channel formed in the wall of the housing tube and extending in the longitudinal direction of the housing tube, at least one signal cable extending out of the front housing cover into the at least one cable channel, leading to the central electrical interface means, of the housing tube.

14. The linear drive device in accordance with claim 13, wherein at least one electrical signal cable starting at a sensor part, which is arranged inside the front housing cover and cooperates without contact with the output drive rod, of the position detecting means enters the at least one cable channel of the housing tube.

15. An electrical linear drive device comprising an outer housing, in which the drive part of a drive unit designed in the form of an electrodynamic linear direct drive is inserted axially like a cartridge so that an output drive rod of the drive unit protrudes from the front side of the outer housing, and the drive part has an external drive housing that accommodates a stationary drive coil arrangement and an axially movable armature, which is connected with the output drive rod and has a drive magnet arrangement, a position detecting means for the detection of at least one axial position of the movable unit comprising the armature and the output drive rod, and a central electrical interface means, connected both with the drive coil arrangement and also with the position detecting means, for external electrical communication, wherein the outer housing possesses a housing tube and, arranged at the ends thereof, a front housing cover and a rear housing cover, which altogether delimit a receiving space completely accommodating the drive part, the output drive rod extending through the front housing cover, and wherein the central electrical interface means is arranged laterally on the housing tube axially between the two housing covers and is connected by way of at least one electrical operation cable with the drive coil arrangement and by way of at least one electrical signal cable, separate from such operation cable, with the position detecting means, and all these electrical cables extend, concealed to the outside, in at least one peripherally closed cable channel formed in the wall of the housing tube and extending in the longitudinal direction of the housing tube, the position detecting means comprising an actuating magnet arranged to the rear on the armature and partaking in the axial movement thereof, the actuating magnet, for the detection of a refracted position of the movable unit, cooperating without contact with a position sensor disposed on the rear housing cover and from the position sensor an electrical signal cable extending, the signal cable extending through the rear housing cover and through a cable channel formed in the wall of the housing tube to the central electrical interface means.

16. The linear drive device in accordance with claim 15, wherein the position detecting means comprises an incremental displacement measurement system, the position sensor constituting a reference sensor for this displacement measurement system.

17. The linear drive device in accordance with claim 16, wherein at least one electrical signal cable connected with the displacement measurement system starting at the front housing cover extends through a cable channel in the housing tube to the central electrical interface means, whereas the at least one electrical signal cable connected with the position sensor and the at least one electrical operation cable starting at the rear housing cover are extending through a cable channel of the housing tube to the central electrical interface means.

18. The linear drive device in accordance with claim 15, wherein the position sensor is secured in an attachment groove arranged at the outer periphery of the rear housing cover, at which attachment groove a cable receiving channel, extending in the rear housing cover, for the associated electrical signal cable opens.

19. The linear drive device in accordance with claim 1, wherein the central electrical interface means is so arranged on the housing tube that it does not protrude at the end past the outer housing.

20. The linear drive device in accordance with claim 1, wherein the central electrical interface means comprises two separate cable outlet means for, on the one hand, at least one electrical connection cable connected with the at least one operation cable and on the other hand at least one further electrical connection cable connected with the at least one electrical signal cable.

21. The linear drive device in accordance with claim 1, wherein on the outer periphery of the housing tube axially extending cooling ribs are formed.

22. The linear drive device in accordance with claim 1, wherein on at least one housing cover there is a mechanical attachment interface rendering possible external attachment.

23. The linear drive device in accordance with claim 1, wherein the rear housing cover as an axial extension of the movable unit has an access opening releasably closed by a closure cover, through which access opening insertion and removal of the movable unit is possible when the closure cover is removed.

* * * * *